United States Patent
Surz

(10) Patent No.: US 8,352,349 B2
(45) Date of Patent: Jan. 8, 2013

(54) SYSTEM AND METHOD FOR OPTIMIZING A TARGET DATE FUND

(76) Inventor: Ronald J. Surz, San Clemente, CA (US)

( * ) Notice: Subject to any disclaimer, the term of this patent is extended or adjusted under 35 U.S.C. 154(b) by 50 days.

(21) Appl. No.: 13/182,351

(22) Filed: Jul. 13, 2011

(65) Prior Publication Data

US 2012/0059770 A1   Mar. 8, 2012

Related U.S. Application Data

(60) Provisional application No. 61/380,636, filed on Sep. 7, 2010.

(51) Int. Cl.
*G06Q 40/00* (2006.01)
(52) U.S. Cl. .......................... 705/36 R; 705/35; 705/37
(58) Field of Classification Search ................ 705/35–37
See application file for complete search history.

(56) References Cited

U.S. PATENT DOCUMENTS

| | | | |
|---|---|---|---|
| 6,275,814 B1 | 8/2001 | Giansante et al. | |
| 8,239,307 B2 * | 8/2012 | Boscaljon | 705/36 R |
| 8,255,308 B2 * | 8/2012 | Dial et al. | 705/36 R |
| 8,275,688 B2 * | 9/2012 | Abidi et al. | 705/36 R |
| 2003/0144936 A1 * | 7/2003 | Sloan et al. | 705/36 |
| 2005/0010516 A1 * | 1/2005 | Ivanov et al. | 705/36 |
| 2008/0010181 A1 * | 1/2008 | Infanger | 705/36 R |
| 2008/0168003 A1 * | 7/2008 | Wald | 705/36 R |
| 2008/0235152 A1 * | 9/2008 | O'Brien et al. | 705/36 R |
| 2009/0048958 A1 * | 2/2009 | Gardner et al. | 705/35 |
| 2009/0094069 A1 * | 4/2009 | Castille et al. | 705/4 |
| 2009/0327155 A1 | 12/2009 | Dial et al. | |
| 2012/0059770 A1 * | 3/2012 | Surz | 705/36 R |
| 2012/0158435 A1 * | 6/2012 | Sexauer et al. | 705/4 |
| 2012/0166359 A1 * | 6/2012 | Sexauer et al. | 705/36 R |
| 2012/0185407 A1 * | 7/2012 | Scott et al. | 705/36 R |
| 2012/0185408 A1 * | 7/2012 | Scott et al. | 705/36 R |

OTHER PUBLICATIONS

Greg Carlson "Fund Spy: Taking Aim at Target Date Funds" Knight Ridder Tribune Business News, Washington, Mar. 9, 2006, pp. 1-2.*
Tom Idzorek "Lifetime Asset Allocations: Methodologies for Target Maturity Funds" Ibbotson Associates Research Report, Feb. 11, 2008, pp. 1-47.*
Capital Guardian: Viewpoints—Benchmarking Success for Target Date Funds, The Capital Group Companies, May 2007, pp. 1-6.*
Considine, G.: Fixing Target Date Strategies: Target Date Folios, FILIOs Investments, Mar. 25, 2008, pp. 1-8.*
Surz, Ron "Differentiating among Target Date Lifecycle Funds", Journal of Financial Service Professionals, v62n3, pp. 19, May 2008.*
Surz, Ronald "Good, bad and ugly of target date", Pensions & Investments v36n6 pp. 12 Mar. 17, 2008.*

(Continued)

*Primary Examiner* — Narayanswamy Subramanian
(74) *Attorney, Agent, or Firm* — Quarles & Brady LLP; Dale Regelman; Nikia L. Gray

(57) ABSTRACT

A method, article of manufacture, and computer program product are presented for generating a glide path for a target date fund comprising a growth asset and a reserve asset, where the glide path is a distribution of the growth and reserve assets over an interval. The method includes identifying an acceptable risk level for the target date fund determining, using the identified acceptable risk level, an inflection interval and calculating the percentages of the target date fund comprising the growth asset and the reserve asset at the inflection date. Finally, the method includes determining the glide path for the target date fund, where at the end of the interval the reserve asset comprises one hundred percent of the target date fund.

18 Claims, 5 Drawing Sheets

OTHER PUBLICATIONS

Surz, Ron "Carrots and sticks and a target-date fix", Employee Benefit Adviser, May 1, 2010, 650 words.*

Yoon, Youngjun "Glide path and dynamic asset allocation of target date funds", Journal of Asset Management v11n5 pp. 346-360 Dec. 2010.*

Surz, Ronald, "Differentiating Among Target Date Lifecycle Funds", Economic Trends and Investment Planning, Journal of Financial Service Professionals, May 2008, pp. 19-20.

Surz, Ronald J., "The good, the bad and the ugly of target date funds", Pensions & Investments, Mar. 17, 2008, 3 pages.

* cited by examiner

SYSTEM AND METHOD FOR OPTIMIZING A TARGET DATE FUND

RELATED APPLICATIONS

This patent application claims priority to U.S. Provisional Application No. 61/380,636 filed on Sep. 7, 2010 which is incorporated by reference herein.

FIELD OF THE INVENTION

The present invention relates generally to funds that adjust the distribution of assets as a predetermined date approaches, and more particularly to methods, systems, and apparatus for determining how to reallocate assets over the investment lifetime.

BACKGROUND

The Pension Protection Act of 2006 established Qualified Default Investment Alternatives (QDIAs) as safe harbors for investing non-allocated defined-contribution assets. The Department of Labor's guidelines for QDIAs advance three investment options: target date funds, balanced funds, and managed accounts.

In the present context, "managed accounts" mean that a service provider tailors diversified portfolios of the plan's investment options on behalf of individual participants. Managed accounts hold the most promise for advisors, but they require adherence to an audited prudent investment process—a process that could take years to achieve scale.

General target date funds (TDFs) are a set-it-and-forget-it, one-size-fits-all approach; they begin aggressively, when the target date is distant, and then reduce risk through time. TDFs are the most popular choice of QDIAs now. However, TDFs have historically been executed poorly because they have been designed to serve beneficiaries beyond the target date—that is, to death. Such funds have become known as "through" funds as contrasted to "to" funds, which are designed to end at the target date. A secondary issue with "to" funds is the amount of equities held at the target date. Individuals face a "risk zone" in investing for retirement, which comprises the five to ten years leading up to and immediately following retirement, or other target event when, savings are at their highest level and the ability to recover from loss is at its lowest. TDFs typically comprise thirty to seventy percent equities during this time, putting the investor at substantial risk if there is a loss. Thus, what is needed is a method of managing a target date fund which ends at the target date in entirely safe assets, while maximizing return during the lifetime of the fund.

SUMMARY

A method is presented for generating a glide path for a target date fund comprising a growth asset and a reserve asset, where the glide path is a distribution of the growth asset and reserve asset over a time period ending on an end date. The method includes identifying an acceptable risk level for the target date fund and determining, using the identified acceptable risk level, an inflection date. The method further includes calculating a value G(i) that is equal to a percentage of the target date fund comprising the growth asset at the inflection date and calculating a value R(i) that is equal to a percentage of the target date fund comprising the reserve asset at the inflection date. Finally, the method includes determining, using G(i) and R(i), the glide path for the target date fund, where at the end date the reserve asset comprises one hundred percent of the target date fund.

In another embodiment, an article of manufacture is presented comprising a computer readable medium having computer readable program code disposed therein to generate a glide path for a target date fund comprising a growth asset and a reserve asset, wherein the glide path includes a distribution of the growth asset and the reserve asset over a time period ending on an end date. The computer readable program code comprising a series of computer readable program steps to effect identifying an acceptable risk level for the target date fund and determining, using the identified acceptable risk level, an inflection date. The computer readable program code further comprises a series of computer readable program steps to effect calculating a value G(i) that is equal to a percentage of the target date fund comprising the growth asset at the inflection date and calculating a value R(i) that is equal to a percentage of the target date fund comprising the reserve asset at the inflection date. Finally, the computer readable program code includes a series of computer readable program steps to effect determining, using G(i) and R(i), the glide path for the target date fund, where at the end date the reserve asset comprises one hundred percent of the target date fund.

In yet another embodiment a computer program product encoded in a non-transitory computer readable medium and useable with a programmable computer processor is presented, where the computer program product is for generating a glide path for a target date fund comprising a growth asset and a reserve asset, where the glide path is a distribution of the growth asset and the reserve asset over a time period ending on the end date. The computer program product includes computer readable program code which causes the programmable processor to identify an acceptable risk level for the target date fund and to determine, using the identified acceptable risk level, an inflection date. The computer program product further includes computer readable program code which causes the programmable processor to calculate a value G(i) that is equal to a percentage of the target date fund comprising the growth asset at the inflection date, to calculate a value R(i) that is equal to a percentage of the target date fund comprising the reserve asset at the inflection date, and to determine, using G(i) and R(i), the glide path for the target date fund, wherein at the end date the reserve asset comprises one hundred percent of the target date fund.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION

Figure 1:
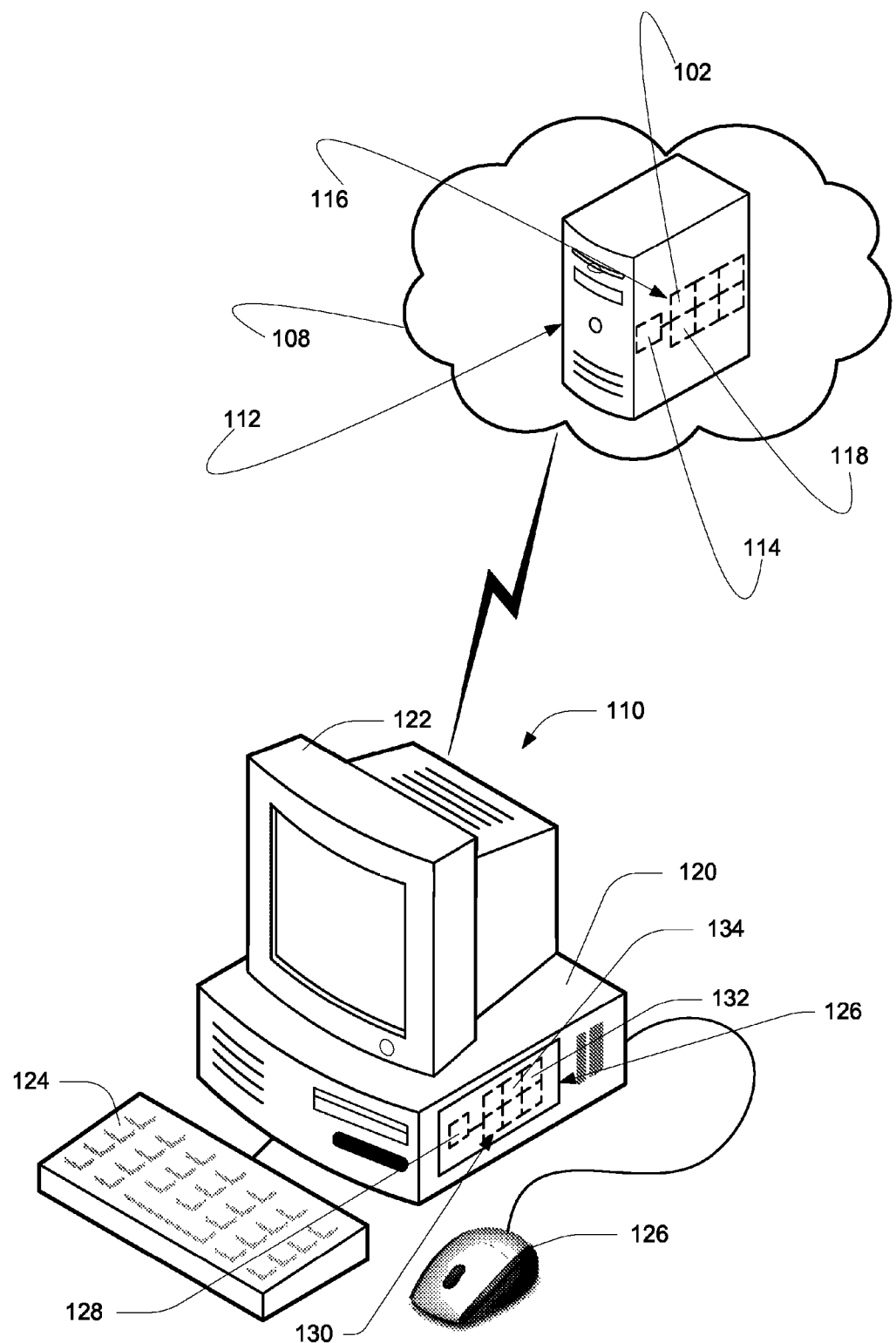
FIG. 1 is a block diagram of an exemplary system for optimizing the allocation of assets in a target date fund and relocating the assets accordingly over time.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow charts included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Applicant's invention generally concerns systems, methods, and apparatus to determine the distribution of target date funds utilizing Applicant's novel glide path algorithm which redistributes the funds among a plurality of investment vehicles. Target date funds are funds that adjust the distribution of assets as a predetermined date approaches, such as retirement or the sending of children to college. The redistribution of assets over the investment lifetime is referred to as a "glide path" and becomes progressively more conservative as the target date approaches. This is done to build wealth during the early years while insuring that the portfolio becomes more stable as the ability to recover from a loss decreases the closer the target date approaches. While the majority of target date funds are for retirement, most end at some stage beyond retirement and thus maintain riskier assets at a time when the portfolio will be unable to recover if there is a loss. Applicant's novel investment model ensures that one-hundred percent (100%) of assets are protected at the target date while providing a sufficient opportunity to build wealth over the investment lifetime.

If asset A is known to a have a particular risk and return whereas asset B is known to have a lower risk and a lower return, than an investor who put's all of his money into asset A or all into asset B can expect the risk and return associated with that asset. The difficulty is in determining the associated risk and return if the investor splits his money between the two assets. The risk and return of a mixed portfolio is not necessarily linear and in fact a mix of asset types can yield a lower risk for a given return than the underlying assets. This follows from the fact that the financial performance of asset A and asset B are not necessarily correlated. A portfolio representing a mix of assets based upon the efficient frontier can be combined with risk free investments to create an optimal portfolio at any defined level of risk.

Turning now to FIG. 1, a system is presented for determining the allocation of assets in a target date fund and relocating the assets in accordance with embodiments of the invention. In certain embodiments, apparatus 110 is connected to a network interface 108, where apparatus 110 comprises computing device 120, visual display device 122, and a data input device, such as for example and without limitation, a keyboard 124, and/or a mouse 126. Computing device 120 comprises controller 126 comprising a programmable processor 128 interconnected via communication links with non-transitory computer readable medium 130, computer readable program code 132 encoded in the non-transitory computer readable medium 130, and optional "WI-FI" module 234. In certain embodiments, computing device 123, visual display device 122, and data input device are combined into a single hand-held device, such as a tablet PC, laptop computer, cellular telephone, or PDA.

In certain embodiments, visual display device 122 comprises a liquid crystal display (LCD) display, or a plasma display. In other embodiments, visual display device 122 comprises a video projector and screen.

In certain embodiments, non-transitory computer readable medium 130 comprises non-volatile memory. In certain embodiments, non-transitory computer readable medium 130 comprises battery backed up RAM, a magnetic hard disk assembly, an optical disk assembly, and/or electronic memory. By "electronic memory," Applicant means a PROM, EPROM, EEPROM, SMARTMEDIA, FLASHMEDIA, and the like.

Optional WI-FI module 234 comprises a wireless network communication module comprising a wireless network permitting communication with one or more external computers or programmable devices in a network or with point-to-point communications. In certain embodiments, WI-FI module 234 implements one or more of the embodiments of IEEE Specification 802.11 (collectively the "IEEE Specification"). As those skilled in the art will appreciate, the IEEE Specification comprises a family of specifications developed by the IEEE for wireless LAN technology.

The IEEE Specification specifies an over-the-air interface between a wireless client, such as for example apparatus 110(d) (FIG. 1), and a server or between two wireless clients. The IEEE accepted the IEEE Specification in 1997. There are several specifications in the 802.11 family, including (i) specification 802.11 which applies to wireless LANs and provides 1 or 2 Mbps transmission in the 2.4 GHz band using either frequency hopping spread spectrum (FHSS) or direct sequence spread spectrum (DSSS); (ii) specification 802.11a which comprises an extension to 802.11 that applies to wireless LANs and provides up to 54 Mbps in the 5 GHz band using an orthogonal frequency division multiplexing encoding scheme rather than FHSS or DSSS; (iii) specification 802.11b, sometimes referred to as 802.11 High Rate or WI-FI, which comprises an extension to 802.11 that applies to wireless LANS and provides up to about 11 Mbps transmission in the 2.4 GHz band; and/or (iv) specification 802.11g which applies to wireless LANs and provides 20+Mbps in the 2.4 GHz band.

Processor 128 uses computer readable program code 132 to operate controller 126, WI-FI module 134, and visual display device 202.

In the illustrated embodiment of FIG. 1, processor 128 of apparatus 110 is connected to a network interface 108. In certain aspects of the invention, network interface 108 is connected to a network. In such embodiments, data may be transmitted to and from processor 128 and the network. In such embodiments, the data may be transmitted using optional Wi-Fi module 134.

In certain embodiments, the network that network interface 108 is connected to is the internet. In other embodiments, network interface 108 connects to a proprietary network, commercial network, ad hoc network, or other network. In certain embodiments, the network may be a local area network (LAN), a wide area network (WAN), a personal area network (PAN), or any other type of network. In certain embodiments, the network is a financial network, such as the Electronic Funds Transfer (EFT) network, credit card network, debit network, ATM network, ACH network, or other financial network.

In certain embodiments, network interface 108 connects to a server 112 on a network. In such embodiments server 112 comprises a programmable processor 114 interconnected via a communication link with computer readable medium 116, and computer readable program code 118 encoded in computer readable medium 116. One of ordinary skill in the art will appreciate that while FIG. 1 depicts a single server, in certain embodiments, network interface 108 may connect to multiple servers without departing from the scope of the present invention.

In certain embodiments, computer readable medium 116 comprises non-volatile memory. In certain embodiments, computer readable medium 116 comprises battery backed up RAM, a magnetic hard disk assembly, an optical disk assembly, and/or electronic memory. By "electronic memory," Applicant means a PROM, EPROM, EEPROM, SMARTMEDIA, FLASHMEDIA, and the like.

In the illustrated embodiment of FIG. 1, server 112 further comprises database 102. In certain embodiments, database 102 may be a third-party database.

Although many other internal components of apparatus 110 and server 112 are not shown, those of ordinary skill in the art will appreciate that such components and the interconnections are well known. Accordingly, additional details concerning the internal construction of apparatus 110 and server 112 need not be disclosed in connection in the present invention.

The Applicant's system as illustrated in FIG. 1 is used to determine the allocation of assets in a target date fund according to Applicant's investment model and to reallocate the assets accordingly. For purposes of illustration and clarity Applicant's investment model is described herein as a two asset model comprising a growth asset and a reserve asset. The growth asset is a broadly diversified portfolio of U.S. stocks, foreign stocks, U.S. bonds, foreign bonds, real estate, commodities, and "opportunistic" investments. By "opportunistic" Applicant means any other investment that is performing well such as, by way of example and not limitation, natural resources, gold, or infrastructure. The reserve asset is a mixture of treasury bills (Tbills) and treasury inflation protected securities (TIPS). In certain embodiments, the reserve asset also includes treasury notes and treasury bonds.

Applicant's investment model distributes the growth asset and the reserve asset according to either a growth model or a liability-driven model depending on whether it is before or after an "inflection date" for that portfolio. The inflection date represents the time when the distribution algorithm switches from the growth model to the liability-driven model. Thus, at the inflection date the distribution of assets according to either model is the same.

Together the growth model and the liability-driven model are referred to as a glide path and balance the rate of return on investments with the associated risk of loss. The growth model governs the distribution of assets from the time of first investment until the inflection date and focuses on generating high returns using the growth asset as, during this early period of investment, there is time for a portfolio to recover if necessary and asset balances are low. The liability-driven model governs the distribution of assets from the inflection date until the target date and focuses on increasing the reserve asset to protect the portfolio as the target date nears and the ability of the investor to recover from significant loss lessens. Thus, Applicant's glide path gradually shifts the asset distribution from high return, high risk investments (the growth asset) to protective investments (the reserve asset) as the target date approaches, where the target date is the date when the reserve asset comprises one-hundred percent (100%) of an investor's portfolio.

Figure 2A:
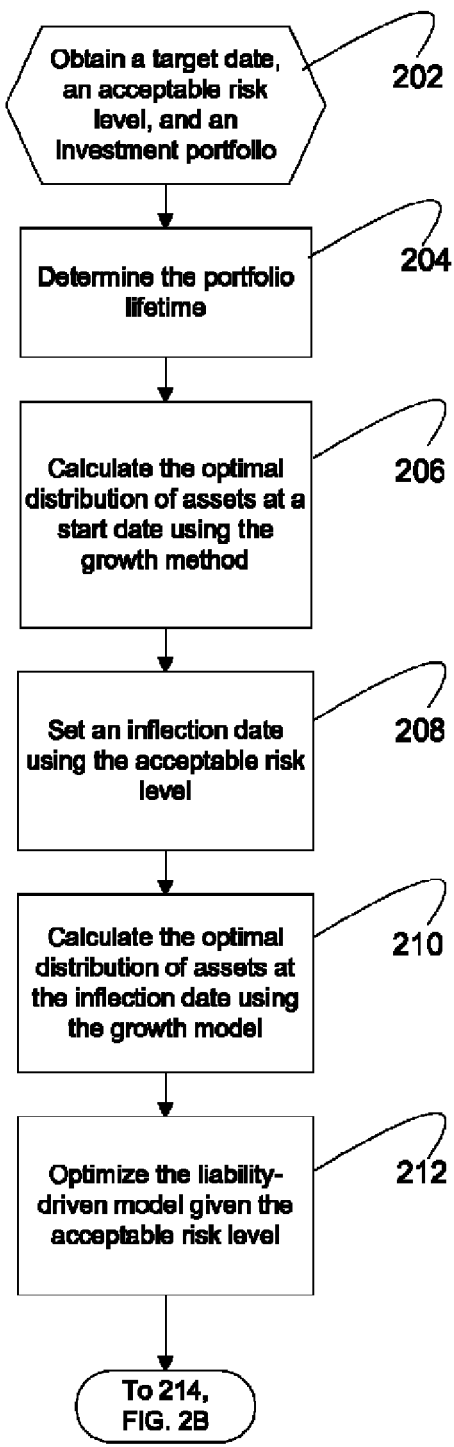
FIGS. 2A and 2B are a flowchart depicting an exemplary method of determining the distribution of assets according to Applicant's glide path given an investor's acceptable risk level and redistributing the investor's portfolio accordingly.
Figure 2B:
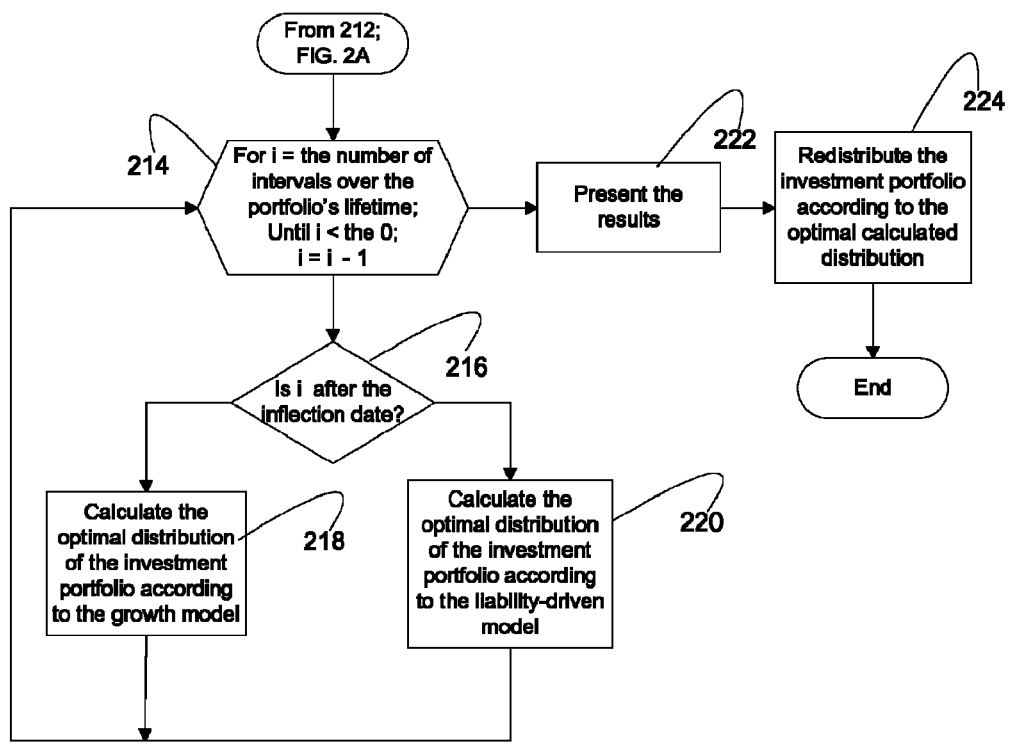

FIGS. 2A and 2B illustrate a method of determining the distribution of the growth asset and reserve asset according to Applicant's glide path and redistributing an investor's assets accordingly. Using the system illustrated in FIG. 1, a target date, acceptable risk level, and investment portfolio of an investor is obtained, where the acceptable risk level is a quantification of the investor's risk aversion, as illustrated by block 202. In certain embodiments, the quantification is in terms of a scale, by way of example and not limitation, from 1 to 10, wherein 10 refers to an investor who is highly risk adverse and 1 refers to an investor who is highly risk tolerant. In other embodiments, the quantification is in terms of high, medium, low risk aversion. In yet other embodiments, any form of quantification of an investor's risk aversion may be used to denote the acceptable risk level.

In certain embodiments, all or a portion of this information represented by block 202 is obtained from a proprietary or third-party database, or a series of databases. In certain embodiments, all or a portion of the information is obtained from a financial or investment institution. In such embodiments, the financial or investment institution may market or manage the investor's investment portfolio. In certain embodiments, all or a portion of the information is provided by the investor.

In certain embodiments, the target date is the year the investor expects to retire. In other embodiments, the target date precedes the expected year of retirement. In yet other embodiments, the target date is later than the expected year of retirement.

In certain embodiments, the acceptable risk level is provided by the investor. In other embodiments, the acceptable risk level is determined based on the current wealth of the investor and the investor's desired asset return amount at the target date. By way of example and not limitation, the acceptable risk level may be high for an investor who has little current wealth and who desires to have high return on their assets at the target date. By comparison, the acceptable risk level may be moderate for an investor with significant wealth who desires to have high return on their assets at the target date. In other embodiments, the acceptable risk level is determined based on the years until the target date and desired asset return amount. By way of example and not limitation, the acceptable risk level may be low where there is forty years until the target date and the investor desires a moderate return on their assets. By comparison the risk level may be high where there is only five years until the target date and the investor desires a moderate return on their assets. In other embodiments, the acceptable risk level is determined based on any other relevant factors.

From the information obtained, the lifetime of the portfolio is determined, as indicated by block 204, where the portfolio lifetime is the length of time which the investor's assets will be invested according to Applicant's model.

The optimal distribution of growth and reserve assets at the start date of the glide path according to the growth model is then determined, as indicated by block 206. The growth model is the set of $G(X)_{GM}$ and $R(X)_{GM}$, wherein $G(X)_{GM}$ is the optimal percentage of the growth asset that the investor's total portfolio should comprise for each year X and $R(X)_{GM}$ is the optimal percentage of the reserve asset for each year X.

In certain embodiments, $G(X)_{GM}$ comprises a set having one or more functions representing the optimal distribution of U.S. bonds, foreign bonds, U.S. stocks, foreign stocks, opportunistic, commodities, and/or real estate over time. In certain embodiments, $R(X)_{GM}$ comprises a set having one or more functions representing the optimal distribution of Tbills and/or TIPS. In certain embodiments, $R(X)_{GM}$ is zero.

As will be appreciated by one of ordinary skill in the art, while the present discussion focuses on yearly intervals, scope of Applicant's invention includes other time intervals, such as by way of example and not limitation, quarterly, monthly, or even daily.

The inflection date is then set based on the acceptable risk level, as indicated by block 208, where the inflection date is in terms of the number of years until the target date. When the acceptable risk level is high, the inflection date will be closer to the target date. Conversely, where the acceptable risk level is low, the inflection date will be further from the target date. The optimal value of growth and reserve assets at the inflection date is then determined using the growth model, as indicated by block 210.

As indicated by block 212, given the identified acceptable risk level, the liability-driven model is then optimized to move the portfolio to one-hundred percent (100%) reserves at the target date while still generating the maximum returns on the growth asset balanced against the increasing risk of unrecoverable loss as the target date nears. As discussed above, at the inflection date the distribution of an investor's assets according to the growth model is equal to the distribution of assets according to the liability-driven model. As also stated, at the target date the investor's portfolio comprises one-hundred percent (100%) reserve assets. In certain embodiments, the optimal distribution of the growth asset over time according to the liability-driven model and given the investor's acceptable risk level can thus be calculated as a straight line where:

$$G(X)_{LDM} = \frac{G_I}{X_I}(X);$$

wherein $G(X)_{LDM}$ is the value of the growth asset according to the liability-driven model, $G_I$ is the value of the growth asset at the inflection date, $X_I$ is the inflection date, and X is the number of years until the target date. Accordingly, the optimal distribution of the reserve asset can be calculated as:

$$R(X)_{LDM} = \left(\frac{R_I - 100}{X_I}\right)X + 100;$$

wherein $R(X)_{LDM}$ is the value of the reserve asset according to the liability-driven model, $R_I$ is the value of the reserve asset at the inflection date, $X_I$ is the inflection date, and X is the number of years until the target date. In this manner the liability-driven model is identified given the acceptable risk level. The liability-driven model is therefore the set comprising $G(X)_{LDM}$ and $R(X)_{LDM}$.

In certain embodiments, the optimal distribution of the reserve asset over time according to the liability-driven model and given the investor's acceptable risk level can be calculated as a curve where:

$$R(X)_{LDM} = \left[1 - \left(\frac{X}{X_I}\right)\right] \cdot \left[\frac{1}{(1+d)^X}\right];$$

wherein $R(X)_{LDM}$ is the value of the reserve asset according to the liability-driven model, $X_I$ is the inflection date, X is the number of years until the target date, and d is the expected annual return on the reserve asset. Accordingly, the optimal distribution of the growth asset can be calculated as:

$$G(X)_{LDM} = 1 - R(X)_{LDM}.$$

wherein $G(X)_{LDM}$ is the value of the growth asset according to the liability-driven model, $G_I$ is the value of the growth asset at the inflection date, $X_I$ is the inflection date, and X is the number of years until the target date. In this manner the liability-driven model is identified given the acceptable risk level. The liability-driven model is therefore the set comprising $G(X)_{LDM}$ and $R(X)_{LDM}$.

As will be appreciated by one of ordinary skill in the art, the optimal distribution of the growth asset and/or the reserve asset may further be calculated in terms of months, weeks, days, or any other increment of time using the formulas provided above.

Once the liability-driven model is optimized, the distribution of the growth asset and the reserve asset for each interval of time until the target date can then be determined. Turning to FIG. 2B, as indicated by blocks 214 and 216, for each time interval over the lifetime of the portfolio, it is determined whether the interval is after the inflection date. If it is not, the optimal distribution is determined using the growth model, as indicated by block 218. If it is, the optimal distribution is determined according to the liability-driven model, as indicated by block 220.

In certain embodiments, the optimal glide path according to Applicant's invention is then presented. In certain embodiments, presenting refers to displaying a chart or graph of the glide path on visual display device 122. In other embodiments, presenting refers to printing the result using a periphery device in communication with apparatus 110. Finally, for each interval over the lifetime of the portfolio, the portfolio is redistributed according to the glide path, as indicated by blocks 222 and 224.

In certain embodiments, individual blocks described above may be combined, eliminated, or reordered.

In certain embodiments, instructions, such as instructions 132 (FIG. 1), are encoded in computer readable medium, such as non-transitory computer readable medium 130 (FIG. 1), wherein those instructions are executed by a processor, such as processor 128 (FIG. 1), to perform one or more of the blocks 202, 204, 206, 208, 210, 212, 214, 216, 218, 220, 222, and 224 recited in FIGS. 2A and 2B.

In yet other embodiments, the invention includes instructions residing in any other computer program product, where those instructions are executed by a computer external to, or internal to, a computing system to perform one or more of the blocks 202, 204, 206, 208, 210, 212, 214, 216, 218, 220, 222, and 224 recited in FIGS. 2A and 2B. In either case the instructions may be encoded in a computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, CompactFlash, SmartMedia, and the like.

Figure 3A:
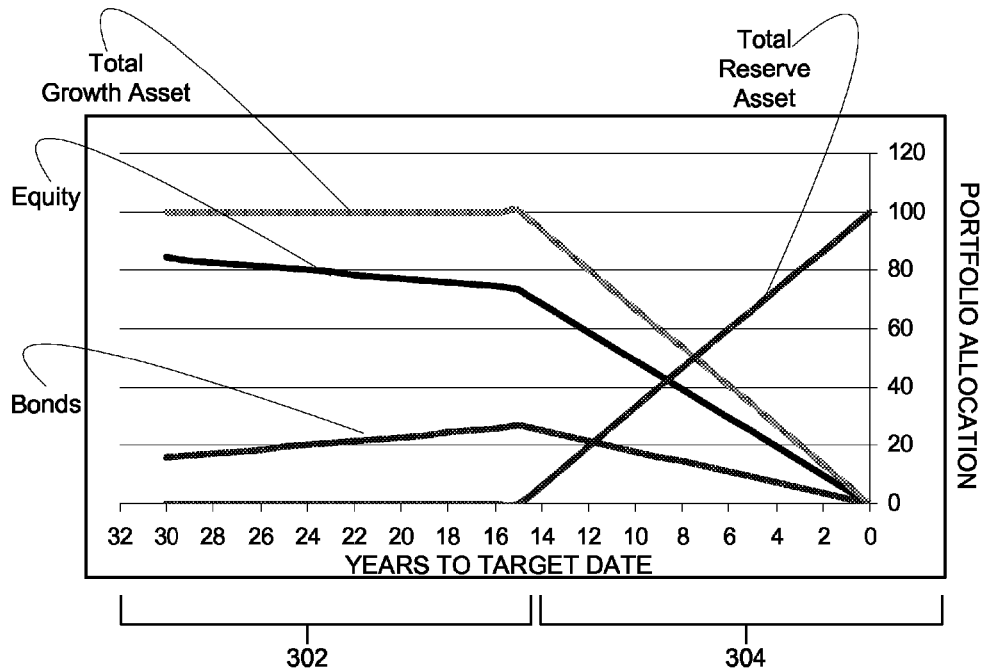
FIG. 3A is a graph representing an exemplary glide path according to Applicant's invention wherein there is a thirty year investment period and the inflection point is at year fifteen.
Figure 3B:
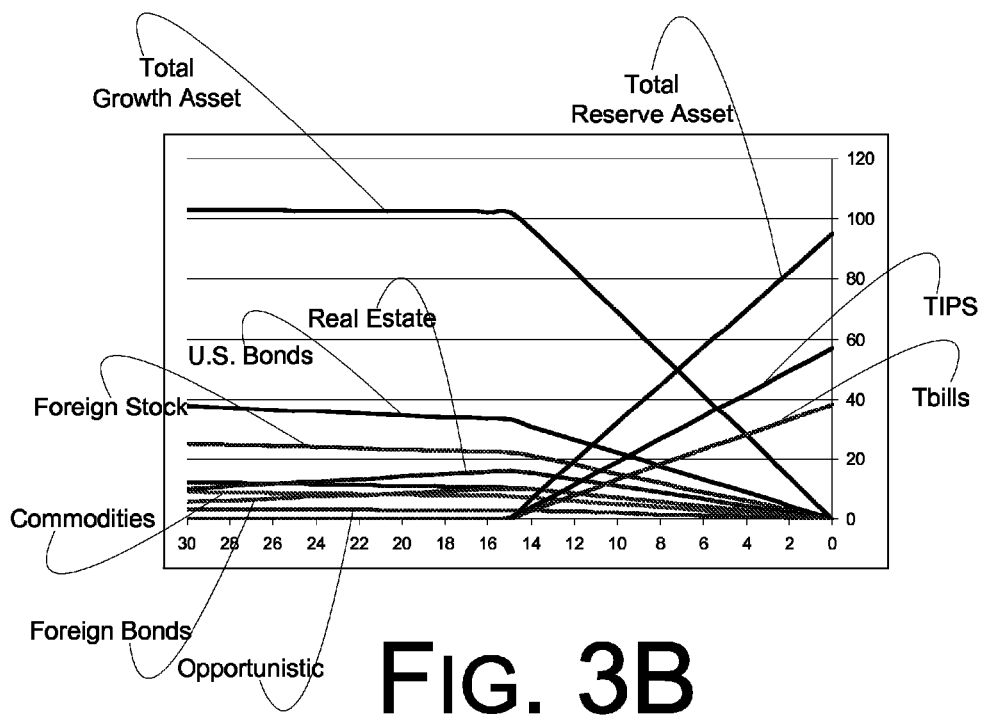
FIG. 3B is a graph of the exemplary glide path of FIG. 3A wherein the growth asset and the reserve asset each comprise a set of functions.

FIG. 3A illustrates an exemplary glide path according to Applicant's invention wherein there is a thirty (30) year investment period and the inflection date is at year fifteen (15). As can be seen in the illustrated embodiment of FIG. 3A, portion 302 of the graph represents the growth model while portion 304 represents the liability-driven model. As can also be seen in the illustrated embodiment of FIG. 3A, the distribution of assets is shown as the set of two functions representing the distribution of equity and bonds. As can be seen in FIG. 3A, at the starting date of the glide path the growth asset equals one-hundred percent (100%) of the total investment portfolio and comprises eighty-five percent (85%) equity and fifteen percent (15%) bonds. FIG. 3B illustrates the exemplary glide path of FIG. 3A wherein the growth asset is further shown as a set of functions representing real estate, commodities, opportunistic, U.S. stocks, foreign stocks, U.S. bonds, and foreign bonds and the reserve asset is shown as two functions representing TIPS and Tbills.

Figure 4:
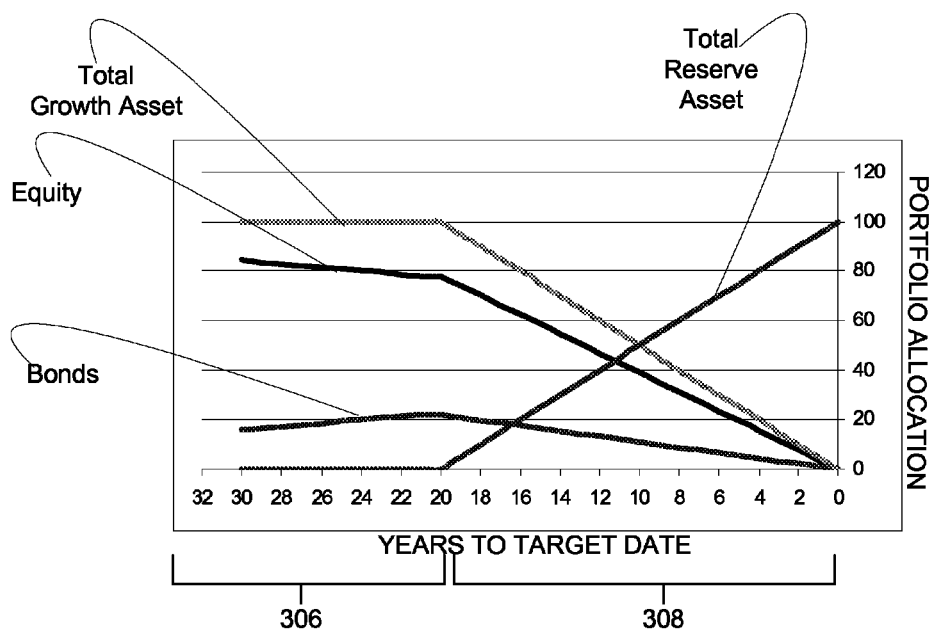
FIG. 4 is a graph representing an exemplary glide path according to Applicant's invention wherein there is a thirty year investment period and the inflection point is at year twenty.
Figure 5:
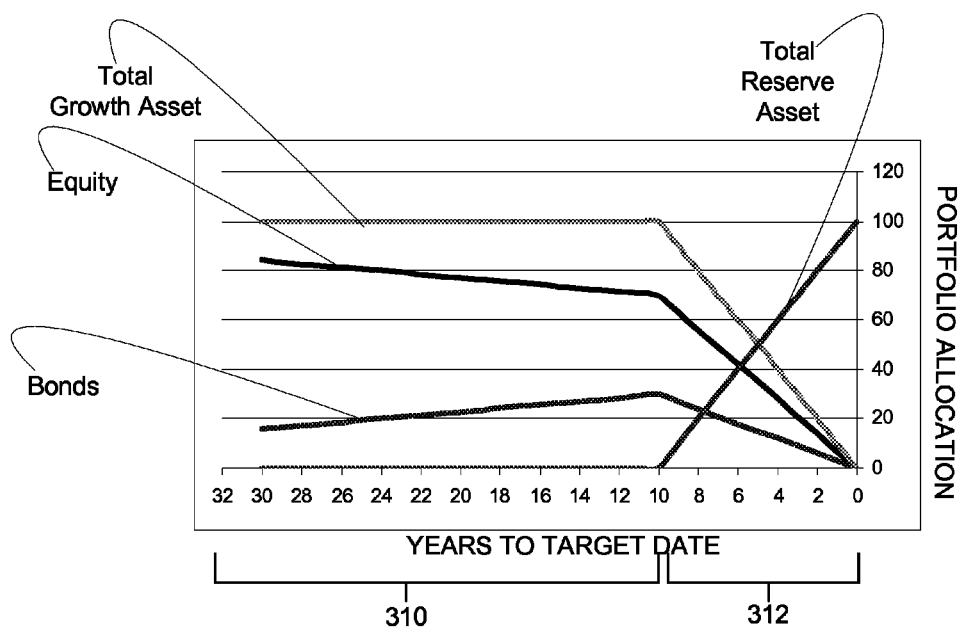
FIG. 5 is a graph representing an exemplary glide path according to Applicant's invention wherein there is a thirty year investment period and the inflection point is at year ten.

FIG. 4 further illustrates an exemplary glide path according to Applicant's invention wherein there is a thirty (30) year investment period and the inflection date is at year twenty (20). As can be seen, portion 306 represents the growth model while portion 308 represents the liability-driven model. Finally, FIG. 5 illustrates an exemplary glide path according to Applicant's invention wherein there is a thirty (30) year investment period and the inflection date is at year ten (10). As can be seen, portion 310 of FIG. 5 represents the growth model while portion 312 represents the liability-driven model.

The description hereinabove should not be interpreted as meaning that Applicant's glide path allocation algorithm comprises two linear investment scenarios. Table 1 shows the investment allocations in a scenario wherein the time to target is 45 years, and wherein the inflection date is set at 16 years.

TABLE 1

| Time to R | Equity | Bonds | Reserve |
|---|---|---|---|
| 45 | 96.3 | 3.7 | 0 |
| 44 | 95.6 | 4.4 | 0 |
| 43 | 94.8 | 5.2 | 0 |
| 42 | 94.1 | 5.9 | 0 |
| 41 | 93.4 | 6.6 | 0 |
| 40 | 92.7 | 7.3 | 0 |
| 39 | 91.9 | 8.1 | 0 |
| 38 | 91.9 | 8.8 | 0 |
| 37 | 90.5 | 9.5 | 0 |
| 36 | 89.7 | 10.3 | 0 |

TABLE 1-continued

| Time to R | Equity | Bonds | Reserve |
|---|---|---|---|
| 35 | 89 | 11 | 0 |
| 34 | 88.2 | 11.8 | 0 |
| 33 | 87.5 | 12.5 | 0 |
| 32 | 86.8 | 13.2 | 0 |
| 31 | 86 | 14 | 0 |
| 30 | 85.3 | 14.7 | 0 |
| 29 | 84.5 | 15.5 | 0 |
| 28 | 83.8 | 16.2 | 0 |
| 27 | 83.1 | 16.9 | 0 |
| 26 | 82.3 | 17.7 | 0 |
| 25 | 81.6 | 18.4 | 0 |
| 24 | 80.9 | 19.1 | 0 |
| 23 | 80.2 | 19.8 | 0 |
| 22 | 79.4 | 20.6 | 0 |
| 21 | 78.7 | 21.3 | 0 |
| 20 | 78 | 22 | 0 |
| 19 | 77.2 | 22.8 | 0 |
| 18 | 76.5 | 23.5 | 0 |
| 17 | 75.7 | 24.3 | 0 |
| 16 | 75 | 25 | 0 |
| 15 | 72.8 | 24.2 | 3 |
| 14 | 70.2 | 23.5 | 6.3 |
| 13 | 67.5 | 22.5 | 10 |
| 12 | 64.5 | 21.5 | 14 |
| 11 | 61.2 | 20.5 | 18.3 |
| 10 | 57.8 | 19.2 | 23 |
| 9 | 53.8 | 18 | 28.2 |
| 8 | 49.7 | 16.5 | 33.8 |
| 7 | 45 | 15 | 40 |
| 6 | 40 | 13.3 | 46.7 |
| 5 | 34.7 | 11.5 | 53.8 |
| 4 | 28.8 | 9.5 | 61.7 |
| 3 | 22.3 | 7.5 | 70.2 |
| 2 | 15.5 | 5.2 | 79.3 |
| 1 | 8 | 2.7 | 89.3 |

As Table 1 shows, the allocation of investments in bonds increases from 45 years to target to 16 years to target. Thereafter, the investment in bonds decreases. This being the case, year 16 comprises the "inflection date" in this scenario.

Table 1 further demonstrates that the investment in bonds drops from 25 percent in year 16 to 2.7 percent in year 1 to 0 in year 0. Table 1 further demonstrates that the investment in equities drops from about 96 percent in year 45 to about 76 in year 15, or about 1.33 percent per year until the inflection date. After the inflection date, the investment in equities drops from 75 percent to 0 percent in 15 years, or about 5 percent per year. The inflection date can be identified by about a 3-4 fold increase in the rate of decrease per year of the equity investment percent.

Table 1 further shows that the ratio of equities investment percent to bond investment percent drops from an initial ratio of about 26 to about 3 at the inflection date. Thereafter, from year 15 to year 1 the ratio remains about constant at about 3. The inflection date can be identified when the ratio of equity percent to bond percent remains constant on a yearly basis.

While the preferred embodiments of the present invention have been illustrated in detail, it should be apparent that modifications and adaptations to those embodiments may occur to one skilled in the art without departing from the scope of the present invention.

What is claimed is:

1. A method of generating a glide path for a target date fund using a computing device comprising a processor and a non-transitory computer readable medium in communication with the processor, wherein the target date fund comprises a growth asset and a reserve asset, wherein the glide path is a set of values comprising a percentage G of the target date fund that is the growth asset and a percentage R of the target date fund that is the reserve asset at each interval (n) over a time period comprising N intervals, wherein (N) is greater than one, the method comprising:
  identifying, using the processor, an acceptable risk level for the target date fund;
  determining, using the processor and the identified acceptable risk level, user-defined inflection interval (n=i) where, when (n) is less than (i), G(n) and R(n) are determined using a growth algorithm, and when (n) is greater than (i), G(n) and R(n) are determined using a liability algorithm, wherein the inflection interval (n=i) is less than (N);
  calculating, using the processor, a value G(i) that is equal to a percentage of the target date fund comprising the growth asset at the inflection interval (n=i);
  calculating, using the processor, a value R(i) that is equal to a percentage of the target date fund comprising the reserve asset at the inflection interval (n=i);
  for each interval (n) where (n) is greater than (i), setting, using the processor and the liability algorithm, $G(n)=G(X)_{LDM}$ and $R(n)=R(X)_{LDM}$, wherein at interval (n=N), R(N) equals 1 and G(N) equals 0, wherein the liability algorithm is given by:

$$R(X)_{LDM} = \left[1 - \left(\frac{X}{X_I}\right)\right] \cdot \left[\frac{1}{(1+d)^X}\right] \text{ and}$$

$$G(X)_{LDM} = 1 - R(X)_{LDM}$$

wherein d is an expected annual return on the reserve asset, wherein X is equal to (N−n), wherein $X_I$ is equal to (N−i); and
  for each interval (n) where (n) is less than (i), setting, using the processor, G(n) equal to one hundred percent of the target date fund.

2. The method of claim 1, wherein the reserve asset comprises treasury bills (Tbills) and treasury inflation protected securities (TIPS), wherein the method further comprises:
  calculating, using the processor, a value RTBills(n) that is equal to a percentage of R(n) that comprises TBills at the (n)th interval; and
  calculating, using the processor, a value RTIPS(n) that is equal to a percentage of R(n) that comprises TIPS at the (n)th interval.

3. The method of claim 1, wherein the growth asset comprises stocks and bonds, wherein the method further comprises:
  calculating, using the processor, a value Gstocks(n) that is equal to a percentage of G(n) that comprises stocks at the (n)th interval; and
  calculating, using the processor, a value Gbonds(n) that is equal to a percentage of G(n) that comprises bonds at the (n)th interval.

4. The method of claim 1, further comprising redistributing, using the processor, the target date fund according to the glide path.

5. The method of claim 4, wherein said redistributing further comprises at each interval (n), reallocating, using the processor, the target date fund such that the growth asset equals G(n) and the reserve asset equals R(n).

6. The method of claim 5, further comprising calculating, using the processor, the number of intervals until the end date.

7. An article of manufacture comprising a non-transitory computer readable medium comprising computer readable program code disposed therein to generate a glide path for a target date fund comprising a growth asset and a reserve asset, wherein the glide path is a set of values comprising a percentage G of the target date fund that is the growth asset and a percentage R of the target date fund that is the reserve asset at each interval (n) over a time period comprising N intervals, wherein (N) is greater than one, the computer readable program code comprising a series of computer readable program steps to effect:
  identifying an acceptable risk level for the target date fund;
  determining, using the identified acceptable risk level, user-defined inflection interval (n=i) where when (n) is less than (i), G(n) and R(n) are determined using a growth algorithm, and when (n) is greater than (i), G(n) and R(n) are determined using a liability algorithm, wherein the inflection interval (n=i) is less than (N);
  calculating a value G(i) that is equal to a percentage of the target date fund comprising the growth asset at the inflection interval (n=i);
  calculating a value R(i) that is equal to a percentage of the target date fund comprising the reserve asset at the inflection interval (n=i);
  for each interval (n) where (n) is greater than (i), setting, using the processor and the liability algorithm, $G(n)=G(X)_{LDM}$ and $R(n)=R(X)_{LDM}$, wherein at interval (n=N), R(N) equals 1 and G(N) equals 0, wherein the liability algorithm is given by:

$$R(X)_{LDM} = \left[1 - \left(\frac{X}{X_I}\right)\right] \cdot \left[\frac{1}{(1+d)^X}\right] \text{ and}$$

$$G(X)_{LDM} = 1 - R(X)_{LDM}$$

wherein d is an expected annual return on the reserve asset, wherein X is equal to (N−n), wherein $X_I$ is equal to (N−i); and
  for each interval (n) where (n) is less than (i), setting, using the processor, G(n) equal to one hundred percent of the target date fund.

8. The article of manufacture of claim 7, wherein the reserve asset comprises treasury bills (Tbills) and treasury inflation protected securities (TIPS), wherein the article of manufacture further comprises a series of computer readable program steps to effect:
  calculating a value RTBills(n) that is equal to a percentage of R(n) that comprises TBills at the (n)th interval; and
  calculating a value RTIPS(n) that is equal to a percentage of R(n) that comprises TIPS at the (n)th interval.

9. The article of manufacture of claim 7, wherein the growth asset comprises stocks and bonds, wherein the article of manufacture further comprises a series of computer readable program steps to effect:
  calculating a value Gstocks(n) that is equal to a percentage of G(n) that comprises stocks at the (n)th interval; and
  calculating a value Gbonds(n) that is equal to a percentage of G(n) that comprises bonds at the (n)th interval.

10. The article of manufacture of claim 7, wherein the computer readable program code further comprises a series of computer readable program steps to effect redistributing the target date fund according to the glide path.

11. The article of manufacture of claim 10, wherein said redistributing further comprises a series of computer readable program steps to effect, at each interval (n), reallocating the target date fund such that the growth asset equals G(n) and the reserve asset equals R(n).

12. The article of manufacture of claim 11, wherein the computer readable program code further comprises a series of computer readable program steps to effect calculating the number of intervals until the end date.

13. A computer program product encoded in a non-transitory computer readable medium and useable with a programmable computer processor to generate a glide path for a target date fund comprising a growth asset and a reserve asset, wherein the glide path is a set of values comprising a percentage G of the target date fund that is the growth asset and a percentage R of the target date fund that is the reserve asset at each interval (n) over a time period comprising N intervals, wherein (N) is greater or equal to one, the computer program product comprising:

computer readable program code which causes the programmable processor to identify an acceptable risk level for the target date fund;

computer readable program code which causes the programmable processor to determine, using the identified acceptable risk level, user-defined inflection interval (n=i) where when (n) is less than (i), G(n) and R(n) are determined using a growth algorithm, and when (n) is greater than (i), G(n) and R(n) are determined using a liability algorithm, wherein the inflection interval (n=i) is less than (N);

computer readable program code which causes the programmable processor to calculate a value G(i) that is equal to a percentage of the target date fund comprising the growth asset at the inflection interval (n=i);

computer readable program code which causes the programmable processor to calculate a value R(i) that is equal to a percentage of the target date fund comprising the reserve asset at the inflection interval (n=i);

computer readable program code which causes the programmable processor, for each interval (n) where (n) is greater than (i), to set, using the liability algorithm, $G(n)=G(X)_{LDM}$ and $R(n)=R(X)_{LDM}$, wherein at interval (n=N), R(N) equals 1 and G(N) equals 0, wherein the liability algorithm is given by:

$$R(X)_{LDM} = \left[1 - \left(\frac{X}{X_I}\right)\right] \cdot \left[\frac{1}{(1+d)^X}\right] \text{ and}$$

$$G(X)_{LDM} = 1 - R(X)_{LDM}$$

wherein d is an expected annual return on the reserve asset, wherein X is equal to (N−n), wherein $X_i$ is equal to (N−i); and computer readable program code which causes the programmable processor, for each interval (n) where (n) is less than (i), to set, using the processor, G(n) equal to one hundred percent of the target date fund.

14. The computer program product of claim 13, wherein the reserve asset comprises treasury bills (Tbills) and treasury inflation protected securities (TIPS), wherein the computer program product further comprises:

computer readable program code which causes the programmable processor to calculate a value RTBills(n) that is equal to a percentage of R(n) that comprises TBills at the (n)th interval; and computer readable program code which causes the programmable processor to calculate a value RTIPS(n) that is equal to a percentage of R(n) that comprises TIPS at the (n)th interval.

15. The computer program product of claim 13, wherein the growth asset comprises stocks and bonds, wherein the computer program product further comprises:

computer readable program code which causes the programmable processor to calculate a value Gstocks(n) that is equal to a percentage of G(n) that comprises stocks at the (n)th interval; and computer readable program code which causes the programmable processor to calculate a value Gbonds(n) that is equal to a percentage of G(n) that comprises bonds at the (n)th interval.

16. The computer program product of claim 13, wherein the computer readable program code further comprises a series of computer readable program steps to effect redistributing the target date fund according to the glide path.

17. The computer program product of claim 16, wherein the computer readable program code which causes the programmable processor to redistribute further comprises computer readable program code which causes the programmable processor to, at each interval (n), reallocate the target date fund such that the growth asset equals G(n) and the reserve asset equals R(n).

18. The computer program product of claim 17, further comprising computer readable program code which causes the programmable processor to calculate the number of intervals until the end date.

* * * * *